3,206,433
PROCESS FOR THE CONVERSION OF NON-
FUSIBLE AND INSOLUBLE POLYACROLEINS
Werner Kern, Mainz, Otto Schweitzer, Konigstein,
Taunus, and Rolf Schulz, Mainz (Rhine), Germany, assignors to Deutsche Gold- und Silber-Scheideanstalt vormals Roessler, Frankfurt am Main, Germany
No Drawing. Filed June 12, 1962, Ser. No. 201,755
Claims priority, application Germany, Mar. 23, 1955,
D 20,095; Jan. 21, 1956, D 22,164
6 Claims. (Cl. 260—67)

The present invention relates to a process for the treatment of non-fusible homopolymers of acrolein which contain substantially no free aldehyde groups and which are normally insoluble in normal organic solvents to convert them into more valuable products and especially products which are soluble in a number of solvents.

It is known that unstabilized acrolein spontaneously polymerizes upon standing to produce a solid, non-fusible and insoluble product which has been designated as "disacryl" (Redtenbacher, Liebigs Ann. Chem. 47 (1843), p. 113). Acrolein furthermore polymerizes under the influence of radical forming catalysts to product infusible polymers which are insoluble in the known organic solvents. It therefore was previously assumed that hardly any double bonds or aldehyde groups were retained in such polymers and that therefore the polyacroleins are unsuited for the production of polyaldehydes (Houben-Weyl, vol. VII, pages 133–135). It was only in certain oligomers of acrolein (Gilbert, Donleavy, J. Amer. Chem. Soc. 60 (1938), p. 1911), and certain copolymers of acrolein with other vinyl compounds that reactive aldehyde groups could be ascertained. The homopolymers of acrolein were previously considered rather unreactive and achieved no technical significance (Schildknecht, Vinyl and Related Polymers, Wiley and Sons, New York, 1952, page 700).

According to the invention it was unexpectedly discovered that the homopolymers of acrolein contrary to prior indications do contain aldehyde groups but that these are in the form of aldehyde-hydrate-ether groupings and therefore not free and that the intermolecular ether groupings are the cause of the cross-linking and therefore their infusibility and insolubility, as indicated in the following formula:

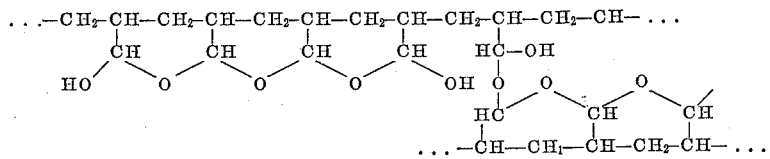

Furthermore, according to the invention it was found unexpectedly that these masked aldehyde groups which are present in all such macromolecular homopolymers of acrolein which are infusible and normally insoluble in all common organic solvents and which are produced by spontaneous or radical polymerization using radical forming catalysts such as redox systems and are macromolecular, having molecular weights above 10,000 (see Staudinger, Makromolekulare Chemie & Biologie, page 4, 1947, Basel), can be caused to react with the functional alcoholic or phenolic hydroxyl or thiol groups as in alcohols, thioalcohols, phenols and thiophenols in the presence of an acid catalyst.

All acid reacting substances, such as non-oxidizing organic or inorganic acids, such as acetic acid, hydrochloric acid, chloroacetic acid, diethyl sulfate, p-toluene sulfonic acid and the like, can be used as the acid catalyst. In the event that the compound to be reacted with the polyacrolein itself is of acidic character in the medium employed, it itself will act as the acid catalyst.

It was surprising that it is possible to react the infusible, insoluble homopolymers of acrolein obtained by spontaneous or radical polymerization under the heterogeneous reaction conditions required. That is, the polyacrolein at the beginning of the reaction is present in solid undissolved form and only the resulting derivative goes into solution as the reaction proceeds. The reaction products in contrast to the starting polyacrolein employed are soluble in a number of organic solvents such as benzene, γ-butyrolactone, nitromethane, dimethyl formamide, acetoacetic ester, ethyl acetate, tetrahydrofurane, acetone, dioxane, pyridine and the like.

By appropriate selection of the reactants it is not only possible to vary the solubility of the products produced, but also other physical properties thereof, such as, for example, temperature stability, within wide limits.

In many instances it has been found advisable to carry out the reaction according to the invention with an excess of the substance which is to react with the acrolein polymer, especially when the reaction product is soluble in such excess. Under some circumstances, it is also advantageous to employ a solvent in which the lower molecular weight reactants, as well as the reaction product, is soluble, even though the polyacrolein itself is insoluble therein. For the production of soluble products, it is necessary that the starting materials contain no cross-linkages through principal C—C valences or contain such cross-linking bonds which are not split under the reaction conditions.

The reactions according to the invention can usually be carried out at room temperature, but moderately raised temperatures expedite the reaction. Temperatures over 150° C often can engender side reactions which may cause the reaction product to lose its solubility.

The process according to the invention can also be employed to obtain polymers which cannot be produced from the corresponding acrolein monomer, either because such monomer is not available or is incapable of polymerizing. In the reactions of the polyacrolein according to the invention no monomeric acrolein is formed and therefore the polyacroleins do not serve as a source of monomeric acrolein.

The products obtained according to the invention can be employed together with other materials to produce synthetic resins or they can be employed by themselves in the production of coatings or lacquers or for the impregnation of textiles. For example, their solutions can be employed for the surface treatment of threads, textiles, films, artificial leather, as well as for the treatment of animal skins and tanned leather produced therefrom. In most instances, solutions containing only a few percent of the products according to the invention are suitable for the surface treatment of textiles.

The following examples will serve to illustrate several modifications of the invention:

*Example 1*

1 gram of polyacrolein obtain by spontaneous polymerization was mixed with 50 cc. of ethyl alcohol and 100 mg. of p-toluene sulfonic acid and the mixture heated under reflux with stirring until complete solution occurred.

Instead of ethyl alcohol, the reaction was also carried out in analogous manner with methanol, n-propanol, n-butanol, ethylene chlorohydrin, 1,3-butylene glycol, ethylene glycol, glycol monoethyl ether, glycolic acid butyl ester, benzyl alcohol, cyclohexanol or other alcohols. Dioxane can, if desired, be employed as a diluent for the reaction.

The reaction was also analogously carried out with a polyacrolein obtained by polymerization of acrolein in the presence of benzoyl peroxide (free radical polymerization) with analogous results.

The reaction products can be precipitated from their solution by appropriate precipitating agents, for example, substances which do not dissolve the reaction product, but are miscible with the solvent. For instance, the ethyl alcohol reaction product can be precipitated from the resulting ethyl alcohol solution by the addition of water or petroleum ether.

*Example 2*

1 gram of polyacrolein obtained by spontaneous polymerization was added to a mixture containing 10 cc. of benzene, 10 cc. of thiophenol and 100 mg. of p-toluene sulfonic acid and the mixture heated on a water bath to 80° C. with stirring. After 1–2 hours, 20 cc. of benzene were added and the mixture centrifuged to remove a small quantity of undissolved material. A colorless high molecular weight product was precipitated from the resulting clear yellowish solution by the addition of ether. The product is soluble in benzene, nitrobenzene, dioxane, pyridine, dimethyl formamide and the like. After four-fold reprecipitation, it contained 19% of sulfur. By treatment with peracids, it could be oxidized to the corresponding polymeric sulfones.

*Example 3*

1 g. of polyacrolein obtained by spontaneous polymerization was mixed with 2.5 cc. of thioglycolic acid and the mixture stirred at room temperature until complete solution was effected. The resulting solution was added dropwise to 350 cc. of water containing 2 cc. of 2 N HCl. The resulting precipitate was reprecipitated by solution in acetone and treatment with acidified water.

*Example 4*

1 g. of an acrolein polymer obtained by bulk polymerization of acrolein with 2.5% benzoyl peroxide at 60° C. (see R. C. Schulz, Makromolekulare Chemie, vol. 17 (1955), p. 62) were heated to the boiling temperature with 100 ccm. n-propanol and 100 milligrams p-toluene sulfonic acid. The solution was filtered after 3 hours and poured in cold water. 1.6 g. polymerized acrolein acetal were obtained.

*Example 5*

560 parts of a polyacrolein of a molecular weight of 56,000 obtained by spontaneous polymerization were introduced into a solution composed of 9 parts of p-chlorophenol and 1 part of water and p-toluene sulfonic acid as catalyst and the mixture allowed to stand for 14 days at room temperature. The ratio of p-chlorophenol to acrolein was 8:1. Complete solution occurred. The reaction product was precipitated with methanol. It was soluble in pyridine or dimethyl formamide.

Analogous results were obtained using monochloroacetic acid or acetic acid instead of the p-toluene sulfonic acid as the catalyst. If the temperature employed for the reaction was raised to 50° C. solution was completed in 12 hours.

*Example 6*

Polyacrolein produced by radical polymerization was placed in a 50% aqueous solution of resorcinol. Complete solution occurred after several days' standing at room temperature.

Analogous results were obtained with a 50% aqueous solution of pyrogallol.

*Example 7*

Further illustrations of reactions carried out according to the invention are tabulated below. The polyacroleins employed in all of the tests, except the one marked with an asterisk, were obtained by polymerization of acrolein with benzoyl peroxide. The polyacrolein in that instance was one obtained by spontanous polymerization.

| Polyacrolein, mg. | Alcohol, cc. | Dioxane, cc. | Catalyst | Temperature °C. | Reaction time in minutes | Yield, mg. |
|---|---|---|---|---|---|---|
| 100 | 10 methanol | ---- | p-Toluene sulfonic acid 10% by wt. (o-Formic acid ethyl ester 0,5 ccm). | 65 | 120 | 153 |
| 100 | 10 ethanol | ---- | p-Toluene sulfonic acid 20% by wt. | 80 | 180 | 143 |
| 100 | 10 n-Butanol | ---- | p-Toluene sulfonic acid 2% by wt. | 100 | 450 | 154 |
| *1000 | 100 n-Butanol | ---- | HCl | 40–90 | 375 | 1500 |
| 100 | 5 ethylene-chlorohydrin | 5 | p-Toluene sulfonic acid 2% by wt. | 60–100 | 30 | 165 |
| 100 | 1,3-butyl glycol 5 cc. | 5 | p-Toluene sulfonic acid 20% by wt. | 100 | 60 | 82 |
| 100 | 10 glycol monoethyl ether | ---- | p-Toluene sulfonic acid 20% by wt. | 100 | 30 | 145 |
| 100 | 5 glycolic acid butyl ester | 5 | p-Toluene sulfonic acid 20% by wt. | 100 | 480 | 116 |
| 100 | 5 benzyl alcohol | 6 | p-Toluene sulfonic acid 20% by wt. | 100 | 60 | 187 |

*Example 8*

The product prepared as indicated in Example 7 (the table line 5) from polyacrolein with n-butanol gives useful films if the solution obtained is sprayed or poured on a glass plate and dried. The films are colorless and flexible and not brittle.

This application is a continuation-in-part of application Serial No. 573,349, filed March 23, 1956, now abandoned.

We claim:

1. A process for the conversion of a macromolecular infusible, insoluble homopolymer of acrolein only, containing masked aldehyde groups in the form of aldehyde-hydrate-ether groups but substantially devoid of free aldehyde groups, selected from the group consisting of polyacroleins obtained by spontaneous polymerization and polyacroleins obtained by radical polymerization to produce polymeric derivatives thereof which are substantially more soluble in selected organic solvents than said homopolymer which comprises reacting such acrolein homopolymer with a substance selected from the group consisting of alcohols, thioalcohols and thiophenols in a non-oxidizing acid medium at a temperature between room temperature and 150° C. to form an acetalized derivative of such homopolymer with said substance.

2. The process of claim 1 in which said acrolein polymer is a polyacrolein obtained by spontaneous polymerization of acrolein.

3. The process of claim 1 in which said acrolein polymer is a polyacrolein obtained by radical polymerization of acrolein.

4. The process of claim 1 in which said reaction is carried out in an excess of such substance reacted with said polymer.

5. The process of claim 1 in which said reaction is carried out in the presence of a solvent for the substance reacted with said polymer and the reaction product.

6. The derivative of polyacrolein produced by the process of claim 1.

References Cited by the Examiner

UNITED STATES PATENTS

| | | | |
|---|---|---|---|
| 1,654,215 | 12/27 | Gams et al. | 260—68 |
| 2,467,430 | 4/49 | Izard | 260—73 |
| 2,569,932 | 10/51 | Izard | 260—67 |
| 2,657,192 | 10/53 | Miller et al. | 260—67 |
| 2,945,837 | 7/60 | Eifert et al. | 260—73 |
| 3,055,866 | 9/62 | Oyanagi | 260—73 |
| 3,079,357 | 2/63 | Fisher | 260—67 |

FOREIGN PATENTS 141,059   12/20   Great Britain.

WILLIAM H. SHORT, *Primary Examiner.*

JOSEPH R. LIBERMAN, *Examiner.*